(12) United States Patent
Lombardini

(10) Patent No.: US 12,325,170 B2
(45) Date of Patent: Jun. 10, 2025

(54) METHOD AND APPARATUS FOR PINNING THE EDGES OF AN EXTRUDED MASS

(71) Applicant: Colines S.p.A., Novara (IT)

(72) Inventor: Nicola Lombardini, Oleggio (IT)

( * ) Notice: Subject to any disclaimer, the term of this patent is extended or adjusted under 35 U.S.C. 154(b) by 14 days.

(21) Appl. No.: 18/401,451

(22) Filed: Dec. 30, 2023

(65) Prior Publication Data

US 2024/0131770 A1   Apr. 25, 2024

Related U.S. Application Data

(62) Division of application No. 17/427,635, filed as application No. PCT/IB2020/051123 on Feb. 12, 2020, now Pat. No. 12,011,864.

(30) Foreign Application Priority Data

Feb. 19, 2019  (IT) .......................... 102019000002389
Feb. 6, 2020   (IT) .......................... 102020000002317

(51) Int. Cl.
*B29C 48/305*  (2019.01)
*B29C 48/08*   (2019.01)
*B29C 48/88*   (2019.01)

(52) U.S. Cl.
CPC .......... *B29C 48/9165* (2019.02); *B29C 48/08* (2019.02); *B29C 48/305* (2019.02); *B29C 48/914* (2019.02); *B29C 48/917* (2019.02)

(58) Field of Classification Search
None
See application file for complete search history.

(56) References Cited

U.S. PATENT DOCUMENTS

| | | | | |
|---|---|---|---|---|
| 3,795,474 A | * | 3/1974 | Heyer | ................ B29C 48/9155 |
| | | | | 425/327 |
| 4,255,365 A | * | 3/1981 | Heyer | ................... B29C 48/914 |
| | | | | 264/211.13 |
| 2012/0086155 A1 | * | 4/2012 | Yamauchi | ............ B29C 48/914 |
| | | | | 264/177.1 |
| 2013/0320596 A1 | * | 12/2013 | Suthisamphat | ..... B29C 48/0022 |
| | | | | 425/72.1 |

FOREIGN PATENT DOCUMENTS

DE   102007017265 A1 * 10/2007   ............. B29C 48/08

* cited by examiner

*Primary Examiner* — Yung-Sheng M Tsui
(74) *Attorney, Agent, or Firm* — Themis Law; Franco A. Serafini

(57) ABSTRACT

A method for pinning the edges of an extruded polymeric mass and an edge-pinning group are described.

2 Claims, 6 Drawing Sheets

METHOD AND APPARATUS FOR PINNING THE EDGES OF AN EXTRUDED MASS

FIELD OF THE INVENTION

The present invention relates to an edge-pinning group in a plastic film extrusion machine and method for pinning the edges of an extruded mass.

BACKGROUND OF THE INVENTION

The production of plastic film for flexible packaging (commonly known as "film") can be carried out using various technologies, among which the most important and the most widespread are certainly the so-called "blown technology" and the so-called "cast" technology.

In the blown technology, in particular, the plastic resin is extruded from the bottom upwards by means of a circular die, and is simultaneously cooled by a blowing of air which envelops it circumferentially.

This technology, extremely widespread especially for the production of lower-quality films, has some technological limitations which inevitably also affect the quality of the film thus produced, above all from the point of view of the optical characteristics and transversal planarity.

The above-mentioned limits of the blown technology are easily overcome by the equally widespread cast technology, wherein the resin melt is literally cast onto a rotating metal cylinder and internally cooled by any cooling fluid, which therefore subjects the melt to an actual thermal "shock".

This technology therefore allows the cooling process to be managed in a much more accurate and therefore qualitatively superior way. The cooling process, in addition obviously to the intrinsic quality of the raw materials used, represents the most important production parameter of the whole production process, the parameter that most influences the quality of the final product.

With the cast technology, in the cooling process of the melt, the possibility of guaranteeing the perfect adhesion of said mass to the cooling cylinder, so as to fully exploit its cooling capacity, is particularly important; this apparatus essentially looks like a heat exchanger, with a hot fluid (i.e. the melt) and a cold fluid (i.e. the refrigerant, of any type) separated by a Fourier wall (i.e. the rotating cylinder).

As already mentioned, the need for ensuring the correct adhesion of the melt on said cylinder is therefore evident, but this necessity contrasts with the natural tendency of the melt of acquiring, once it leaves the extrusion die, the so-called condition with the lowest possible potential.

The condition with the lowest possible potential is exemplified in the attached FIG. 1, in which the behavior of the melt 10 cast onto a rotating cylinder 11 positioned at a distance d from the extrusion die 12, is represented.

The width of the melt 10 gradually decreases, "sliding" on the surface of the cylinder, due to the molecular bonds present inside it, which tend to lose energy, by agglomerating, as already mentioned, in the most favorable energy condition possible, that is, that with the least potential.

This phenomenon causes the formation of the so-called "neck-in", again visible in FIG. 1, which causes a very clear restriction of the width of the film produced, in addition to causing a considerable difficulty in registering the thickness of the film in the ends, disturbed by the behavior described above.

In particular, due to the impossibility of controlling the movement of the melt on the edges, there is less possibility of ensuring a constant or at least manageable thickness in two large portions of the film corresponding specifically to the two ends at the sides of the film. These portions of the film can even represent (based on the total width of the same melt) an extremely significant percentage of the whole product.

In order to overcome this problem, the prior art has recently introduced a device known to those skilled in the art as an "edge-pinning device", that is a device capable of generating an extremely high-voltage electric discharge (up to 30 kV and more), but with a very low amperage (at the most a few tenths of a mA); this discharge directly affects the extreme edges of the melt 10 when it touches the rotating cylinder 11 and consequently, as the cylinder 11, typically metallic, is rotating, the adhesion is obtained between the two elements.

What is briefly described is best exemplified in the attached FIG. 2, in which it can be seen how the action of so-called edge-pinning devices can effectively minimize the neck-in phenomenon, significantly reducing its detrimental effects.

In this figure, in addition to the melt 10, the rotating cylinder 11 and the extrusion die 12, already shown in FIG. 1, the edge-pinning systems 13 can also be seen, schematically represented as "cubes" from which some electrodes emerge (variable in number), which provide for the generation of the electrical discharge previously described.

The difference in behavior of the melt with respect to the solution presented in FIG. 1 can be immediately noted; the edge-pinning system, which can have the most varied embodiments (cylinder, strip, cube, single electrode rather than multiple electrodes) is therefore still used today in all plastic film production plants produced with the cast technology.

The applications of the edge-pinning devices known in the state of the art, however, have some technological limits that constrain their performance, and which the solution according to the present invention proposes to overcome.

It is known, in fact, that the generalized trend of the flexible packaging market, at which this invention is essentially aimed, is now definitively and certainly directed towards so-called "downgauging", i.e. towards a continuous reduction in the thickness of the films. This trend depends on obvious economic reasons and not less important issues relating to environmental protection (reduction in the weight of the packaging=reduction in $CO_2$ emissions for its production).

All producers of flexible packaging films, none excluded, have been and are therefore working to achieve this goal, naturally also in collaboration with resin producers and with plant constructors.

The most immediate consequence of "downgauging" is the (logical) request for increasing the production rate of the extrusion lines in order to guarantee in any case an output "adequate" for containing the production costs, also considering the need for using higher-quality (and therefore more costly) resins than those commonly used for the production of plastic films having a greater final thickness.

This possibility of increasing the production rates of the extrusion lines is directly related to the presence of effective edge-pinning systems, which must be all the more efficient and effective, the higher the velocity of the production line; it is easy and logical to imagine in fact that the "grip" of the edges of the melt on the cooled rotating cylinder (hereinafter called "chill-roll" for convenience) is inversely proportional to the velocity of the line. As the velocity of the line increases, in fact, the time available for electrostatically charging the edge of the melt is increasingly reduced.

There are also other less obvious aspects, but absolutely clear to the eye of skilled persons in the field, which show how the increase in velocity is strictly linked to the gripping efficiency of the edges, such as:

- the necessity of increasing the extrusion temperatures to make the melt more fluid (which must be "stretched" to the desired thickness, often equal to a few microns!), a necessity that makes the mass itself more unstable;
- the least amount of time that passes from the discharge of the melt from the extrusion die to the point of contact with the chill-roll, with a melt which therefore comes into contact with the chill-roll at a higher temperature (i.e. the melt loses less heat in the air due to the shorter residence time);
- the reduced thickness of the melt already at the contact point with the chill-roll, which makes it more sensitive to the environmental conditions (presence of possible air currents, ambient temperature, etc.).

By way of example, in order to better contextualize in numerical terms what downgauging means, it is sufficient to consider the field of stretch film, or the film commonly used as a secondary packaging for the pallets of any type of goods.

This film, which represents the sector of greatest world consumption of polyethylene, in turn the most widespread thermoplastic resin on a worldwide level, in the past had a commonly used reference thickness, i.e. 23 microns; by choosing different types of resins, more or less valuable, the physical and mechanical characteristics of the film could be varied considerably, but the thickness was considered practically a constant.

In recent years there has been a progressive decrease in the reference thickness, which today is substantially identified in two different values (which depend more than anything else on the place where the film is actually used): 17 microns (mainly for Europe, North Africa and the Middle East) and 12 microns (Americas and the Far East).

In order to maintain the productivity of the extrusion lines at acceptable levels, it was therefore necessary to increase the production rate in some cases by 35% and in others up to over 90%!

The production rates, in fact, once rarely exceeded 350-400 m/min, whereas today the actual rates are 600-650 m/min.

These increases in rates, which have taken place over the past 10-15 years, have therefore created the need for dramatically improving the efficiency of the whole production line, naturally starting with the edge-pinning devices; the increased requirements of the production process have undoubtedly had the support required by major extrusion-line manufacturers; at the moment, however, the above-mentioned value of 600-650 m/min seems to represent an impassable velocity limit, beyond which the following edge-gripping problems emerge.

The action of the edge-pinning devices, as mentioned above, has the specific purpose of making the edges of the melt adhere to the chill-roll so as to avoid, or at least minimize, the neck-in phenomenon, in turn deriving from the tendency of the melt to "pursue" its condition with less potential; this trend, however, does not only concern the edges of the melt, but the whole body of the melt which therefore tends to move towards the center of the chill-roll, literally "sliding" over it.

This trend is naturally greater the higher the potential of the melt, i.e. its temperature, and the slower the cooling process of the same, which on the other hand has the aim of lowering the potential by subtracting heat.

The two above-mentioned aspects (high melt temperature and slow cooling process) are intrinsic to the production of low-thickness films at high velocities, which, as already mentioned, require high temperatures to make the melt more fluid and therefore facilitate its "stretching" up to very low thicknesses, and whose cooling process is forcibly slow due to the reduced residence time on the chill-roll as a result of the high velocity.

This phenomenon is exemplified in the attached FIG. 3, where the "flow lines" 14 of the melt 10 are represented, which literally slide on the chill-roll, in the direction indicated by the arrow.

The result of this phenomenon is the impossibility of controlling the area of film between the flow lines "blocked" by the edge pinner on the surface of the chill-roll and the flow lines 14 that have moved towards the center of the chill-roll; what is worse, however, is that in this area, the thickness of the final film is significantly less with respect to the rest of the width, as, in addition to the natural stretching in the direction of the machine determined by the ratio between the velocity of the chill-roll and the mass flow rate of the melt, there is also the transverse stretch given by the displacement (or "sliding") of the flow lines corresponding to this area towards the center.

In short, the profile of the film seen in section immediately after the chill-roll, is presented as shown in the attached FIG. 4, where an "increased" thickness area 15 is evident, due to the inevitable neck-in effect, therefore an area having a thickness lower than nominal 16, and finally the area with a nominal thickness 17, controllable and manageable without any problems.

If the presence of the low-thickness area 16 is substantially irrelevant in the case of the production of high-thickness films (as it is in any case part of the area of film which is trimmed before winding), it becomes of particular importance however when considering low-thickness films.

In the case, in fact, of the production of films having a nominal thickness of 12 microns, for example, as exemplified above, the reduced thickness area 16 can have values equal to a few microns; it is evident that under these conditions, the stability of this area of the film is extremely labile, as an impurity, albeit microscopic, is sufficient for creating a hole or, even worse, the complete breakage of the film.

In addition to this difficulty, there are others, no less important, and in any case always linked to the increase in the production rate.

In particular, the high extrusion rate determines, as already mentioned above, a considerable temperature of the melt at the moment of its contact with the chill-roll, or at the moment of the action of the electrostatic discharge generated by the edge-pinning system; this significant temperature can lead to various negative effects, first of all a definite instability of the melt which, as it is in a semi-liquid state, does not have its own shape and is therefore difficult to control.

Furthermore, phenomena such as the so-called "draw down resonance", or a sort of oscillation of the melt, also due to the excessive temperature and its semi-liquid nature, can intervene.

In addition, a further problem closely linked not only to the velocity, but also to the edge-pinning concept is reflected in a behavior of the edge of the melt typically linked to the production of low-thickness films.

The action of the edge-pinning device, as already mentioned, has the purpose of charging the edge of the melt with electrostatic current to facilitate its adhesion with the chill-roll; the very nature of the polymers, which are extremely poor current conductors (they are in fact excellent insulators), causes this charge to be concentrated particularly in correspondence with the electrodes of the same edge-pinning device, and not on a larger area.

The circumscription of the area affected by the edge-pinning devices is well seen also from a production point of view, as the smaller this area, the greater will be the portion of film not "disturbed" by the neck-in action and of the edge-pinning device itself; it is therefore common practice to reduce the area of action of the edge-pinning device to the minimum, limiting it to the most extreme edge (10-20 mm maximum) of the melt.

By limiting the area of action of the edge-pinning device to these values, there is however the risk of "losing" the edge, whose regularity cannot be absolute due to the normal quality tolerances of the same resins used. These tolerances can cause variations in the width of the melt (due to slight variations in the viscosity and therefore pressure) of a few mm, identified with 15' in the attached FIGS. 5 and 6 subsequently examined.

An excessively "extreme" positioning of the edge-pinning devices, or too much on the edge, could therefore cause the loss of the same due to said slight oscillations in the width of the melt; it is therefore customary for said edge-pinning devices to be positioned a few mm with respect to the edge, in order to remedy these variations.

This positioning of the edge-pinning devices, however, governed, as seen, by purely practical and productive reasons, has the defect of generating a sort of light, uncontrolled and constant "ear", corresponding to the size of the slight variations in the width of the melt previously described, as exemplified in the attached FIGS. 5 and 6.

In FIG. 5, in particular, the classic positioning of the edge-pinning device 13 can be appreciated, i.e. at a height of 15' with respect to the extreme edge of the melt 10 (said edge, as already mentioned, being variable to the extent of a few mm).

In the sectional view of FIG. 6, on the other hand, the consequence of the positioning of the edge-pinning device 13 as indicated above, can be appreciated, which leads to the formation of said "ear" which is not completely and constantly controlled.

The height 15', as indicated, represents the variation in width to which the melt is subject due to the inevitable tolerances to which the raw material itself is subject, and therefore cannot be controlled a priori.

The presence of this ear, or peduncle, becomes absolutely detrimental in the case of the production of low-thickness films at high velocities, as it represents an irregularity that causes undulations, folds and grooves; to the inexperienced eye it may seem an exaggeration or a forcing, but it should always be borne in mind that these are production conditions objectively at the limit of current technology, i.e. nominal thicknesses of a few microns and velocities equal to hundreds of meters per minute.

Examples of edge-pinning groups according to the state of the art, not without the drawbacks specified above, are described in US 2013/320596, US 2012/086155, U.S. Pat. Nos. 3,779,682 and 4,255,365.

SUMMARY OF THE INVENTION

The present invention therefore intends to brilliantly overcome all the limits described above by means of a particular edge-pinning group, consisting of various elements already known in the common art, but combined in an absolutely innovative way.

The present invention therefore relates to an edge-pinning group 13 in a plastic film extrusion machine, comprising or consisting of the following elements: a pair of supports 18', 18", each support 18',18" bearing at least one electrode 19, and a pair of nozzles 20, 21, said group being characterized in that said elements are positioned in the edge-pinning group 13 with respect to the extrusion direction of the machine "Y" and with respect to the extrusion surface (S), passing through or containing the extrusion direction of the machine "Y", as follows:

with respect to the direction "Y", the first nozzle 21 is positioned upstream of the second nozzle 20, said second nozzle 20 being positioned upstream and in line with the first support 18', and said second support 18" being positioned parallel to or downstream of the first support 18;

with respect to the center line of the extrusion surface (S), the second support 18" is positioned externally with respect to the first support 18', said first support 18' being positioned parallel to the second nozzle 20, in turn positioned externally with respect to the first nozzle 21.

Said nozzles 20, 21 are configured for being supplied with compressed air or with air coming from an independent blower.

In particular, with respect to the center line of the extrusion surface (S), the second support 18" is positioned externally with respect to the first support 18' and can be in line with the support 18'.

The present invention also relates to a method for pinning the edges of an extruded polymeric mass 10, comprising the following steps:

an extrusion step in which the polymeric mass 10 is extruded from an extrusion die 12; at least two pre-cooling steps, wherein two areas are defined in the extruded polymeric mass 10 along each of the external edges of the mass itself, respectively having a width equal to (a) and (b) 15' and 15 and a length equal to the length of the extruded mass 10, wherein the area having a width (a) 15', having a variable width, is arranged flush with the edge of the extruded mass 10 and the area having a width (b) 15 is adjacent to the area having a width (a) 15', internally with respect to the edge of the extruded mass 10, and a third area having a width equal to (c), 16, and a length equal to the length of the extruded mass 10, adjacent to the area having a width (b) 15, internally with respect to the edge of the extruded mass 10;

in the first pre-cooling step, the area 16 having a width (c) of the polymeric mass 10 is pre-cooled by the action of an air flow, before the extruded mass 10 is cast and comes into contact with the surface of a rotating cylinder 11 positioned at a distance d from the extrusion die 12;

in the second subsequent pre-cooling step, the area 15 having a width (b) is pre-cooled by means of a second flow of air, before the extruded mass 10 is cast and comes into contact with the surface of a rotating cylinder 11 positioned at a distance d from the extrusion die 12; said method being characterized in that it comprises at least two electrostatic charging steps of the extruded polymeric mass 10, wherein in the first electrostatic charging step, the area having a width (b) 15, pre-cooled in the previous step, is electrostatically charged to favour its adhesion to the surface of the cylinder 11 and ensure the correct heat exchange between the two elements;

in the second electrostatic charging step, the area having a width (a) 15', including the tip of the edges of the extruded mass 10, externally with respect to the area having a width (b) 15, treated in the previous step, is electrostatically charged.

The area having a width (a) 15' has a variable width as it includes the tip, which is variable, of the edges of the extruded mass 10.

With respect to the center line of the extrusion surface (S), passing through or containing the extrusion direction of the machine "Y", the second support 18", positioned externally with respect to the second nozzle 20 and the first support 18', in turn arranged in parallel, is positioned in correspondence with the area having a width (a) 15'.

With this positioning, it covers and compensates for the variations in area of the extruded polymer mass with respect to the center line of the extrusion surface (S).

The above-mentioned variations in this area having a width (a) 15' and therefore also the positioning of the support 18", depend on the nature of the polymer and on numerous process factors, but they can be indicatively provided according to these parameters.

In the case, for example, of an extruded polymeric mass which is a polyethylene film, preferably a linear low-density polyethylene, having a thickness ranging from 6 microns to 20 microns, the extrusion rate ranging from 500 m/min to over 800 m/min, the value of the width (a) 15' is substantially variable within a range of 0 to 10 mm approximately, and the value of the width (b) 15 is substantially included within a range of 15 to 25 mm approximately. The value of the width (c) 16 is substantially variable within a range of 20 mm to 50 mm approximately.

The present invention also relates to a machine for the extrusion of plastic film comprising said edge-pinning group.

Said machine for the extrusion of plastic film 10 comprises an extrusion die 12, a rotating cylinder or chill-roll 11 and at least one edge-pinning group 13, wherein said edge-pinning group 13 comprises or consists of the following elements: a pair of supports 18',18", each support 18',18" bearing at least one electrode 19, and a pair of nozzles 20, 21, said elements of the edge-pinning group 13 being positioned in said group 13, in said machine, as follows with respect to the extrusion direction of the machine "Y" and with respect to the surface (R) of the cooling cylinder 11:

with respect to the direction "Y", the first nozzle 21 is positioned upstream of the second nozzle 20, said second nozzle 20 being positioned upstream and in line with the first support 18', and said second support 18" being positioned in parallel or downstream of the first support 18;

with respect to the center line of the surface (R) of the cooling cylinder 11, the second support 18" is positioned externally with respect to the first support 18', said first support 18' being positioned parallel to the second nozzle 20, in turn positioned externally with respect to the first nozzle 21.

Said edge-pinning group 13 in a machine for the extrusion of plastic film 10 can also be defined as an edge-pinning group 13 comprising or consisting of the following elements: a pair of supports 18',18", each support 18',18" bearing at least one electrode 19, and a pair of nozzles 20, 21, said group being characterized in that said elements are positioned in the edge-pinning group with respect to the extrusion direction of the machine "Y", as follows:

with respect to the direction "Y", the first nozzle 21 is positioned upstream of the second nozzle 20, said second nozzle 20 being positioned upstream and in line with the first support 18', and said second support 18" being positioned in parallel or downstream of the first support 18; said elements also being characterized in that the first nozzle 21 is configured for partially pre-cooling an area 16 of the extruded melt 10 before it even touches the surface of a rotating cylinder 11, to decrease its potential by removing heat;

the second nozzle 20 is configured for pre-cooling an edge area of melt 10 affected by the electrostatic discharge of the one or more electrodes 19 positioned on the first support 18', before it comes into contact with the rotating cylinder 11;

the first support 18' is configured for electrostatically charging the edge area 15 of the melt 10 cooled by the second nozzle 20 to facilitate its adhesion to the surface of the rotating cylinder 11 and consequently ensure the correct heat exchange between the two elements;

the second support 18" is configured for blocking the external edge area 15' of the melt 10, which is thus caused to adhere to the rotating cylinder 11 avoiding the formation of peduncles.

BRIEF DESCRIPTION OF THE DRAWINGS

The structural and functional characteristics of the present invention and its advantages with respect to the known art will appear even more evident from the following description, referring to the attached schematic drawings, which show an embodiment example of the invention itself. In the drawings.

DETAILED DESCRIPTION OF EMBODIMENTS OF THE INVENTION

Figure 7:
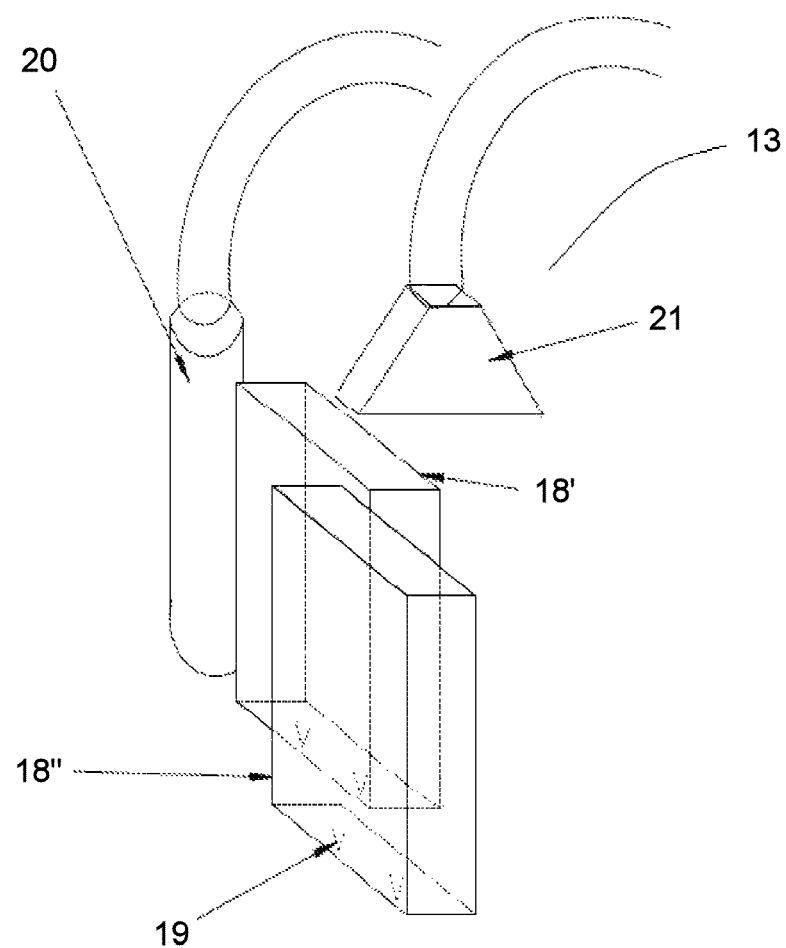
FIG. 7 is a schematic representation of an edge-pinning group according to the present invention.

With reference to the figures, in particular, FIG. 7 schematically shows the edge-pinning group 13 object of the present invention, consisting of a pair of supports 18' and 18", each support 18' and 18" bearing at least one electrode 19, and a pair of nozzles 20 and 21, each of which is supplied with compressed air or with air from an independent blower.

The precise spatial positioning of the elements constituting the invention is best exemplified in the following FIGS. 8a and 8b, with particular reference to the sequence in which said elements must be present.

Figure 8A:
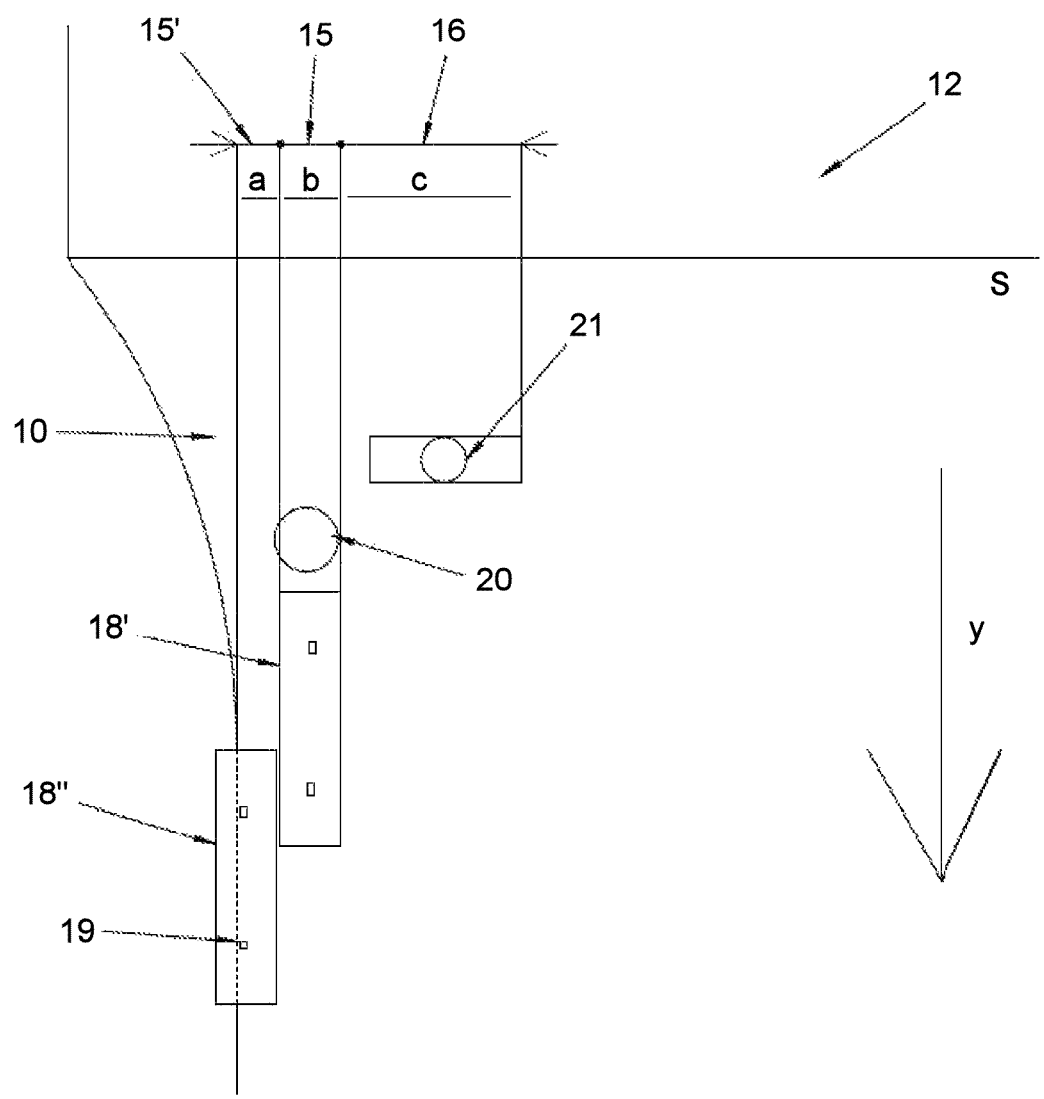
FIG. 8a is a plan view of an embodiment of an edge-pinning group according to the present invention.

FIG. 8a shows in particular the spatial interaction between the various elements with reference to the center line of the extrusion surface (S), passing through or containing the extrusion direction of the machine "Y" and with respect to the axis Y which obviously corresponds to the axis of the extrusion line.

Figure 1:
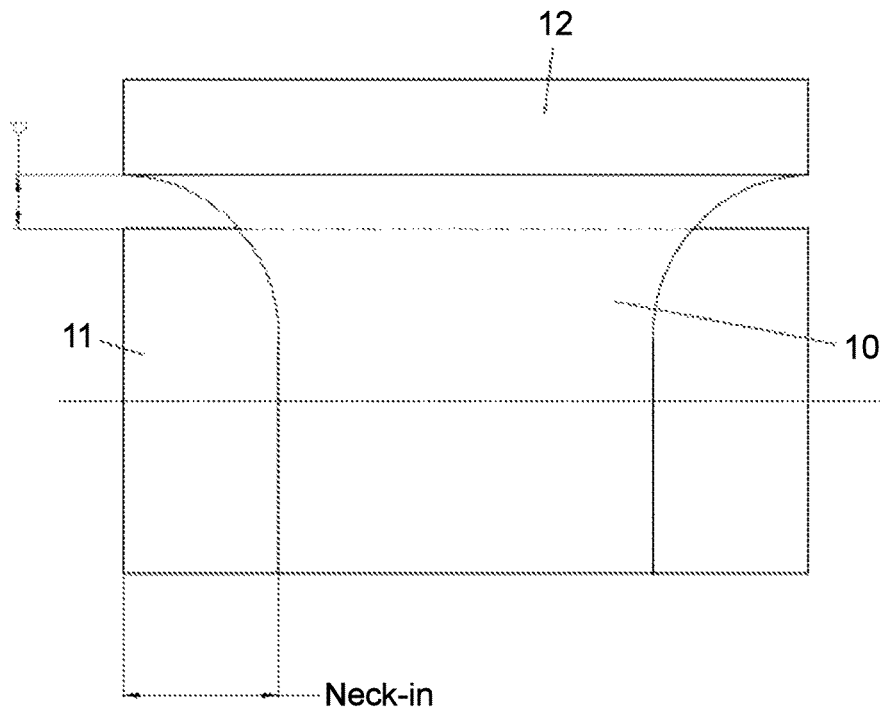
FIGS. 1-6 are schematic representations relating to cast technology solutions with and without edge-pinning devices, according to the state of the art.
Figure 2:
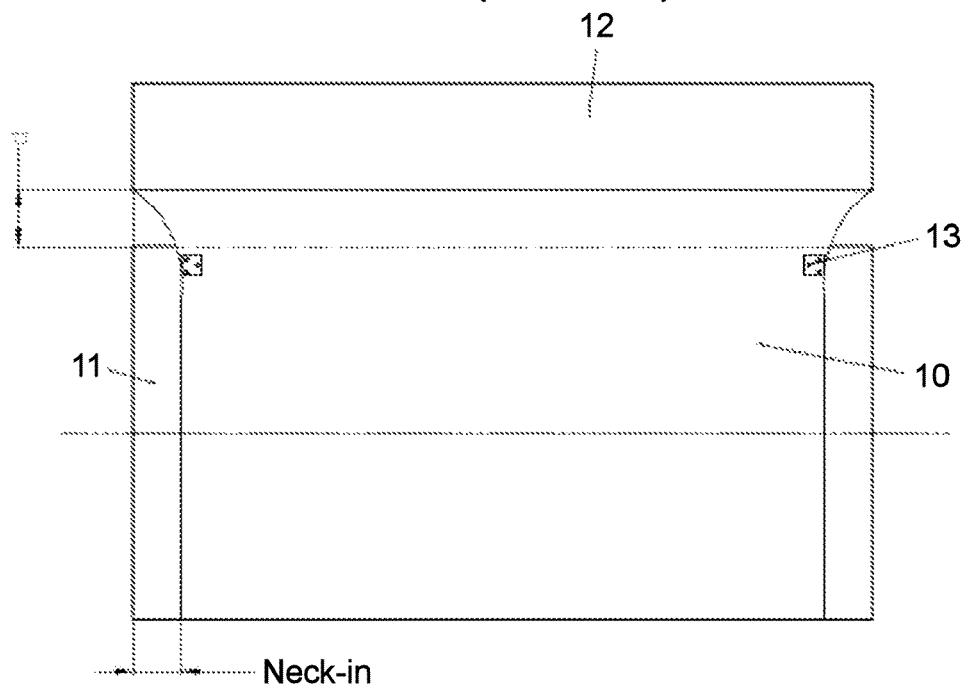
Figure 3:
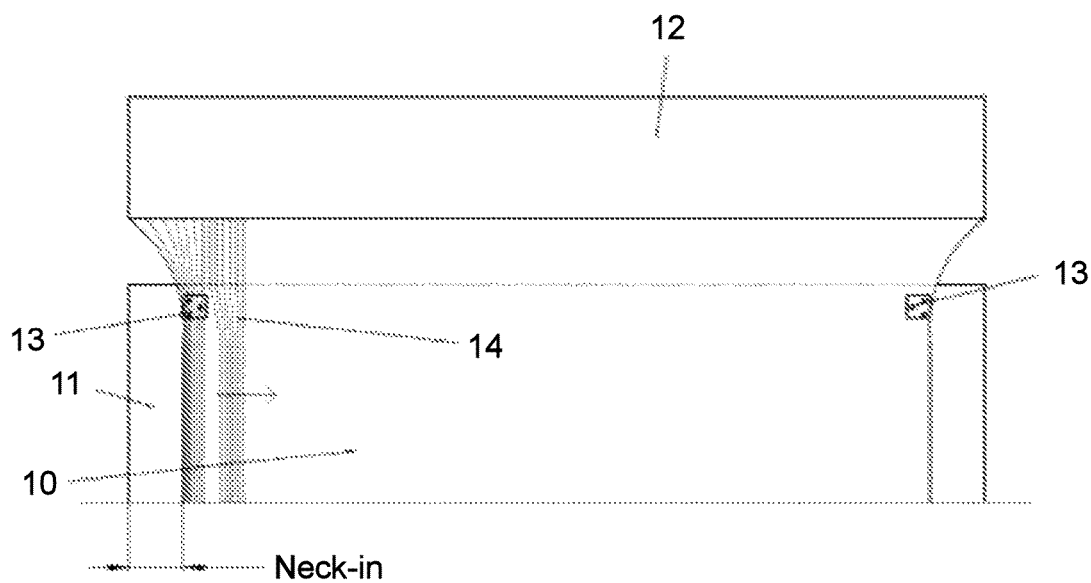
Figure 4:
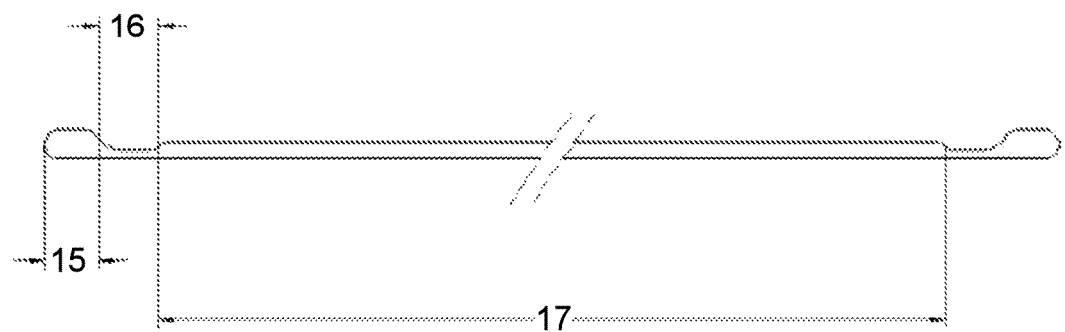
Figure 5:
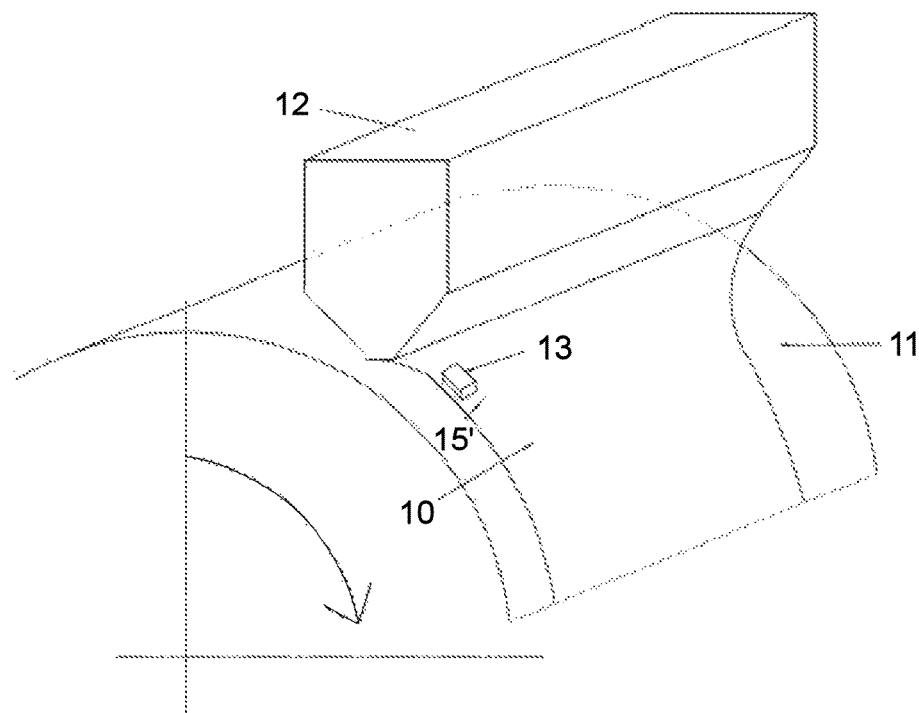

In particular, following the axis "Y", it can be seen that the first element present is the nozzle 21, which partially pre-cools the area of extruded melt 10 which, with reference to the center line of the extrusion surface (S), corresponds to the area 16 indicated in FIG. 4, said area having a width (c).

This area of the melt, in the absence of this pre-cooling, would tend to "slide" towards the center of the chill-roll, generating the above-mentioned area 16 having a reduced thickness; through the action of the nozzle 21, on the other hand, the formation of this area 16 having a reduced thickness can be completely avoided, decreasing its potential by removing heat, thus prefiguring the formation of a film with a constant thickness (except of course for the area 15 affected by the neck-in).

Figure 8B:
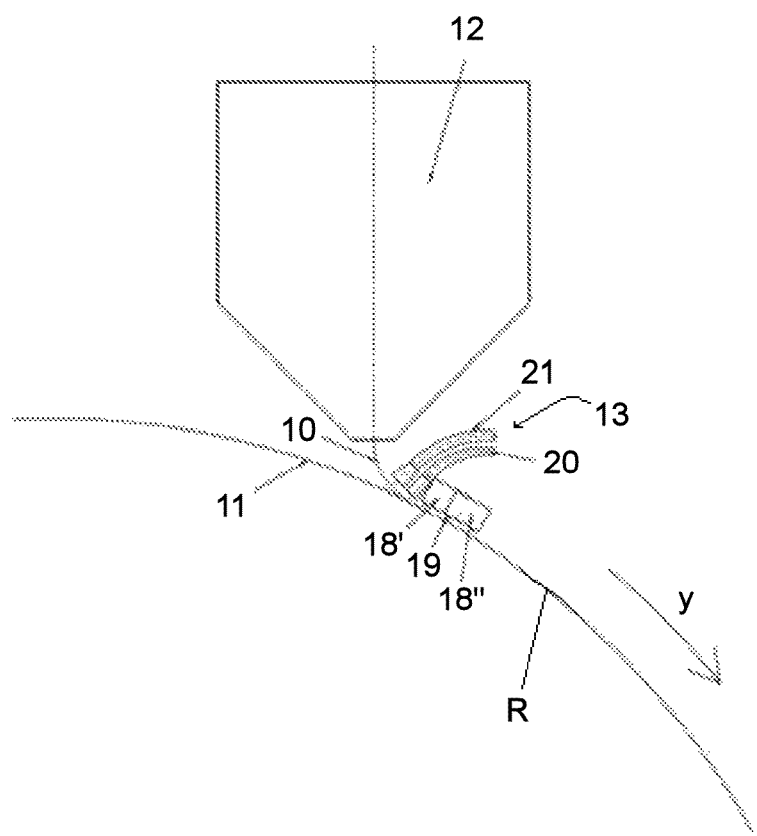
FIG. 8b is a side view of an edge-pinning group according to the present invention.

The position of this nozzle 21 appears even clearer by looking at FIG. 8b, where it can be seen that the action of the air blow ensured by this nozzle 21 envelops the area 16 of the melt 10 before it even touches the surface (R) of the chill-roll 11 and is therefore subjected to the cooling process which relates to the whole film, and which therefore cannot be controlled sectorally.

The second element present in spatial order, again following the axis "Y", is the nozzle 20, whose action allows the partial pre-cooling of the edge area of the melt 10 (said area having a width (b) 15 of the same) affected by the electrostatic discharge of the electrodes before it comes into contact with the chill-roll, allowing better control even in the case of high velocities and reduced thicknesses and thus avoiding said draw-down-resonance phenomena.

From FIG. 8a, the perfect alignment between this nozzle 20 and the support 18' in the direction "Y", and the positioning of the nozzle 20 in correspondence with the area having a width (b), 15, with respect to the edge (variable) of the melt and at the center line of the extrusion surface (S), can be particularly appreciated.

FIG. 8b on the other hand shows how the action of this nozzle 20 takes place preferably (but not exclusively) on the melt 10, immediately before it comes into contact with the surface of the chill-roll 11, for the same reasons explained in the previous paragraph.

Continuing along the axis "Y", the next element encountered is the support 18', bearing at least one electrode 19, which, as already indicated, is perfectly aligned with the nozzle 20; its positioning with respect to the center line of the extrusion surface (S) is therefore also identified by the area having a width (b) 15, previously mentioned.

The function of this support is, as already mentioned, that of classic edge-pinning devices, i.e. it must electrostatically charge a portion of the melt as small as possible in order to favour its adhesion to the surface of the chill-roll and consequently ensure the correct heat exchange between the two elements. This portion corresponds to the area having a width (b), 15, previously defined.

Subsequently, again following the axis "Y", there is the support 18", which is preferably, but not exclusively, positioned further downstream with respect to the support 18" in the extrusion direction "Y", but above all it is displaced with respect to the center line of the extrusion surface (S), in the area having a width (a) 15' towards the variable edge of the melt 10.

As indicated above, the extent of the width of the area (a) 15' is subject to even major and significant variations based on the type of polymer and the process conditions.

Figure 6:
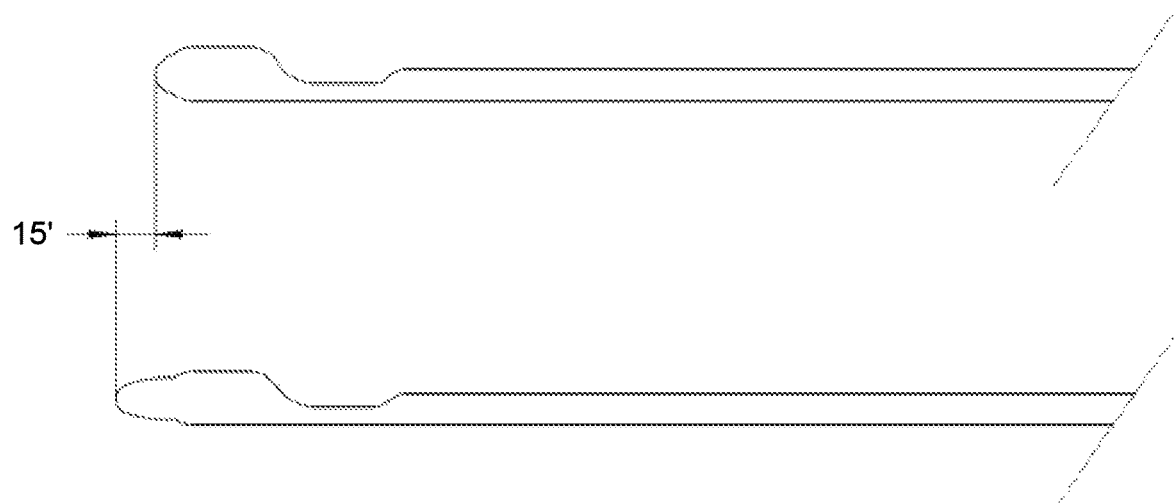

The action of this support 18", also equipped with at least one electrode 19, is essentially that of blocking the variable portion of melt corresponding to the area having a width (a) 15', which is thus caused to adhere to the chill-roll, avoiding the formation of the peduncle shown in FIG. 6, but which, even in its absence, (due as said to the variability of the width of the melt), in no way jeopardizes the stability of the film thanks to the action of the first support 18'.

The various elements forming part of the invention can obviously be supported in the most varied ways, i.e. by means of micrometrically or electrically adjustable supports (to ensure the repeatability of positioning), just as the relative positions between the various elements can, indeed must, be able to be regulated within a range wide enough to take into account the production requirements.

The constructive forms of the relative supports, besides being able to acquire the most varied physiognomies, have not been schematized for the sake of simplicity of display and specifically because they change in shape and size.

The essential elements are obviously all the elements forming the edge-pinning system according to the present invention and the interaction between the same, fundamental for ensuring the correct functioning of the invention.

The protection scope of the present invention is therefore defined by the enclosed claims.

The invention claimed is:

1. A method for pinning edges of an extruded polymeric mass (10), comprising the following steps:
   extruding a polymeric mass (10) from an extrusion die (12);
   pre-cooling in at least two pre-cooling steps,
   wherein:
   two areas are defined in the extruded polymeric mass (10) along each of external edges of the polymeric mass, having a width respectively equal to (a) and (b) (15' and 15) and a length equal to the length of the extruded mass (10), wherein the area having the width (a) (15'), which is a variable width, is arranged flush with an edge of the extruded mass (10), and wherein the area having the width (b) (15) is adjacent to the area having the width (a) (15'), internally with respect to the edge of the extruded mass (10), and
   a third area is defined having a width equal to (c), (16), and a length equal to the length of the extruded mass (10), adjacent to the area having the width (b) (15), internally with respect to the edge of the extruded mass (10);
   wherein in a first pre-cooling step of the at least two pre-cooling steps, the area (16) having a width (c) of the polymeric mass (10) is pre-cooled by action of an air flow, before the extruded mass (10) is cast and comes into contact with a surface of a rotating cylinder (11) positioned at a distance (d) from the extrusion die (12);
   wherein in a second subsequent pre-cooling step of the at least two pre-cooling steps, the area (15) having a width (b) is pre-cooled by action of a second air flow, before the extruded mass (10) is cast and comes into contact with the surface of the rotating cylinder (11) positioned at the distance d from the extrusion die (12); and
   electrostatically charging, in at least two electrostatic charging steps, the extruded polymeric mass (10), wherein:
   in a first electrostatic charging step of the at least two electrostatic charging steps, the area having the width (b) (15), after the pre-cooling, is electrostatically charged to favor its adhesion to the surface of the rotating cylinder (11) and ensure a desired heat exchange between the area having the width (b) and the rotating cylinder; and
   in a second electrostatic charging step of the at least two electrostatic charging steps, the area having a width (a) (15'), arranged flush with the edges of the extruded mass (10), externally with respect to the area having a width (b) (15), treated in the first electrostatic charging step, is electrostatically charged.

2. The method according to claim 1, wherein the extruded polymeric mass (10) is a polyethylene film having a thickness ranging from 6 microns to 20 microns, an extrusion rate ranging from 500 m/min to over 800 m/min, a value of the width (a) (15') being variable within a range of 0 to 10 mm, a value of the width (b) (15) being included within a range of 15 to 25 mm, and a value of the width (c) (16) being variable within a range of 20 to 50 mm.

\* \* \* \* \*